United States Patent
Liu et al.

(10) Patent No.: US 10,232,454 B2
(45) Date of Patent: Mar. 19, 2019

(54) HIGH-PRECISION WHEEL CAP SECTION BURR REMOVING DEVICE

(71) Applicant: CITIC Dicastal CO.,LTD, Qinhuangdao (CN)

(72) Inventors: Huiying Liu, Qinhuangdao (CN); Xiao Liu, Qinhuangdao (CN); Guangcai Wei, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 0 days.

(21) Appl. No.: 15/842,197

(22) Filed: Dec. 14, 2017

(65) Prior Publication Data
US 2019/0030631 A1  Jan. 31, 2019

(30) Foreign Application Priority Data
Jul. 31, 2017 (CN) .......................... 2017 1 0635537

(51) Int. Cl.
| | | |
|---|---|---|
| B23B 41/00 | (2006.01) | |
| B23D 79/12 | (2006.01) | |
| B23B 51/10 | (2006.01) | |
| B23Q 5/40 | (2006.01) | |
| B22D 11/126 | (2006.01) | |

(52) U.S. Cl.
CPC ............ *B23D 79/12* (2013.01); *B22D 11/126* (2013.01); *B23B 51/101* (2013.01); *B23Q 5/40* (2013.01); *B23B 2220/08* (2013.01)

(58) Field of Classification Search
CPC ........ B23D 79/12; B22D 11/126; B23Q 5/40; B23B 51/101; B23B 2220/08
See application file for complete search history.

(56) References Cited

U.S. PATENT DOCUMENTS

| | | | | |
|---|---|---|---|---|
| 2,657,597 A | * | 11/1953 | Pickering | B23B 51/101 408/200 |
| 3,951,563 A | * | 4/1976 | Ravenhall | G01B 7/315 408/1 R |
| 5,503,508 A | * | 4/1996 | Amiguet | B23B 31/4006 269/24 |
| 6,015,247 A | * | 1/2000 | Branaman | B23B 47/28 144/365 |
| 2011/0068544 A1 | * | 3/2011 | Prust | B23B 31/16275 279/4.02 |

* cited by examiner

*Primary Examiner* — Daniel W Howell
*Assistant Examiner* — Paul M Janeski
(74) *Attorney, Agent, or Firm* — Calfee, Halter & Griswold LLP

(57) ABSTRACT

Disclosed is a high-precision wheel cap section burr removing device, including a frame, jacking cylinders, guide posts, a servo motor, a lifting table, a bearing seat, a shaft, a bearing, a rotating table, adjusting guide rails, an adjusting cylinder, a left sliding table, a gear rack, a right sliding table, pre-positioning cylinders, pre-positioning guide rails, a sliding plate I, a sliding plate II, pre-positioning posts, corner cylinder pressure claws, a left burr cutter and a right burr cutter. The precision positioning system and the burr removing cutter system are integrated to reduce the combined error, and the rotating centers of the burr cutters are superposed with the central axes of the cap section burrs to realize high-precision burr removal, thereby effectively solving the problems of deviation and non-uniformity of burr removal at the cap section.

1 Claim, 6 Drawing Sheets

HIGH-PRECISION WHEEL CAP SECTION BURR REMOVING DEVICE

CROSS-REFERENCE TO RELATED APPLICATIONS

This application claims priority to Chinese Patent Application No. 201710635537.9, filed on Jul. 31, 2017, which is hereby incorporated by reference in its entirety.

TECHNICAL FIELD

The present application relates to the technical field of cleaning of burrs at cap sections of wheels after machining, specifically to a device for automatically removing burrs at a cap section with high precision.

BACKGROUND ART

The cap section of an aluminum alloy wheel is a joint area of a casting surface and a machining surface and thus has a ring of burrs. The traditional burr removing method is relatively low in positioning precision and poor in consistency of removal of burrs at the cap section edge, and has a phenomenon of non-uniformity, i.e., the removal quantity may be too large on one side of the cap section edge and too small on the other side. Due to low precision when the burrs are removed, chamfers at the cap section edge are not uniform, the thickness of a film after coating is also not uniform, the film at large chamfers is too thick, whereas the film at small chamfers is insufficient in thickness, thus finally causing corrosion, experimental failure and even customer complaint.

SUMMARY OF THE INVENTION

The present application is aimed at providing a high-precision wheel cap section burr removing device, which can meet the requirement of an automatic production line and solve the problem of non-uniformity of chamfers. By the device, the concentricity of cap section edge chamfers and the cap section can be improved, the problems of non-uniformity and deviation of cap section chamfers are solved and the probability of cap section edge corrosion is greatly reduced. A wheel is machined by a first turning procedure and a second turning procedure, causing coaxiality deviation between the first procedure and the second procedure, so in order to realize high-precision removal of burrs, high-precision positioning must be adopted. The diameter of a cap seam allowance and the burr part of a cap section edge are synchronously turned by the two procedures, so that the concentricity consistency is better. Thus, in a positioning scheme, pre-positioning is completed using the inside outer rim turned by the first procedure, and then precision positioning is completed using the diameter side of the cap seam allowance. By integrating a positioning system and a cutter system, the combined error is reduced, and the problems of deviation and non-uniformity of burr removal at the cap section can be effectively solved.

In order to fulfill the above aim, the present application adopts the following technical solution: A high-precision wheel cap section burr removing device includes a frame, jacking cylinders, guide posts, a servo motor, a lifting table, a bearing seat, a shaft, a bearing, a rotating table, adjusting guide rails, an adjusting cylinder, a left sliding table, a gear rack, a right sliding table, pre-positioning cylinders, pre-positioning guide rails, a sliding plate I, a sliding plate II, pre-positioning posts, corner cylinder pressure claws, a left burr cutter and a right burr cutter.

The four pre-positioning guide rails are symmetrically mounted on the frame, and the sliding plate I and the sliding plate II are respectively mounted on the pre-positioning guide rails and driven by the pre-positioning cylinders. Two pre-positioning posts are mounted on the sliding plate I, another two pre-positioning posts are also symmetrically mounted on the sliding plate II, and the corner cylinder pressure claws are mounted on the pre-positioning posts. When the left and right pre-positioning cylinders drive the sliding plate I and the sliding plate II to move synchronously, the four pre-positioning posts can pre-position a wheel; and after pre-positioning of the wheel is completed, the pre-positioning cylinders drive the sliding plate I and the sliding plate II to synchronously retract a distance, the four pre-positioning posts do not contact the wheel any more, the clearance is preferably 2-3 mm, and the clearance is reserved for precision positioning.

The two jacking cylinders and the four guide posts are mounted at the bottom of the frame, the output ends of the jacking cylinders are connected with the lifting table, the servo motor is mounted on the lifting table, the output end of the servo motor is connected with the rotating table via the shaft, the bearing and the bearing seat, the rotating table can be driven to move up and down by extension and retraction of the jacking cylinders, and the servo motor can drive the rotating table to rotate.

The two adjusting guide rails are mounted on the rotating table, the left sliding table and the right sliding table are symmetrically mounted on the adjusting guide rails and connected by the gear rack, the adjusting cylinder is fixed on the side of the rotating table, and the output end of the adjusting cylinder is connected with the left sliding table. The left burr cutter and the right burr cutter are symmetrically mounted on the left sliding table and the right sliding table, the top of the left burr cutter is composed of a left precision positioning surface and a left cutting edge, and the top of the right burr cutter is composed of a right precision positioning surface and a right cutting edge. The left precision positioning surface and the right precision positioning surface constitute a precision positioning system, and the left cutting edge and the right cutting edge constitute a cutter system. When the adjusting cylinder drives the left sliding table and the right sliding table to move synchronously, the distance between the left precision positioning surface and the right precision positioning surface can be adjusted to match the diameter side of a cap seam allowance, thereby realizing precision positioning; and the distance between the left cutting edge and the right cutting edge can also be adjusted to contact cap section burrs. The precision positioning system and the burr removing cutter system are integrated to reduce the combined error, and the rotating centers of the burr cutters are superposed with the central axes of the cap section burrs to realize high-precision burr removal, thereby effectively solving the problems of deviation and non-uniformity of burr removal at the cap section.

The working process of the device is as follows: firstly, the left and right pre-positioning cylinders are synchronously started to drive the sliding plate I and the sliding plate II to move synchronously, the four pre-positioning posts can pre-position a wheel; and after pre-positioning of the wheel is completed, the pre-positioning cylinders drive the sliding plate I and the sliding plate II to synchronously retract a distance, the four pre-positioning posts do not contact the wheel any more, the clearance is preferably 2-3 mm, and the clearance is reserved for precision positioning. Then, the jacking cylinders are started to drive the rotating table to ascend; when the positioning surfaces of the left burr cutter and the right burr cutter reach the cap seam allowance of the wheel, the rotating table stops ascending, at the moment, the adjusting cylinder is started to adjust the distance between the left burr cutter and the right burr cutter, the left precision positioning surface and the right precision positioning surface contact the diameter side of the cap seam allowance to hold the cap seam allowance of the wheel tightly, and precision positioning of the wheel is thus completed; and after precision positioning of the wheel, the corner cylinder pressure claws are started to press the wheel. Next, the adjusting cylinder is continuously started to shorten the distance between the left burr cutter and the right burr cutter, the positioning surfaces leave the sides of the cap seam allowance, and then the jacking cylinders are started to drive the burr cutters to ascend; when the cutting edges of the burr cutters reach the height of the cap section burrs, the burr cutters stop ascending, at the moment, the adjusting cylinder is restarted to adjust the distance between the left cutting edge and the right cutting edge, and the cutting edges contact the cap section burrs; and finally, the servo motor drives the rotating table to rotate one circle, and the cutting edges of the burr cutters remove the ring of burrs. After the burrs are removed, the positioning system and the cutter system are reset, this is a cyclic working process of the device, and so on.

The precision positioning system and the burr removing cutter system are integrated to reduce the combined error, and the rotating centers of the burr cutters are superposed with the central axes of the cap section burrs to realize high-precision burr removal, thereby effectively solving the problems of deviation and non-uniformity of burr removal at the cap section. The device has the characteristics of novel structure, skilful design, accuracy, high efficiency, simple operation and the like.

Figure 1:
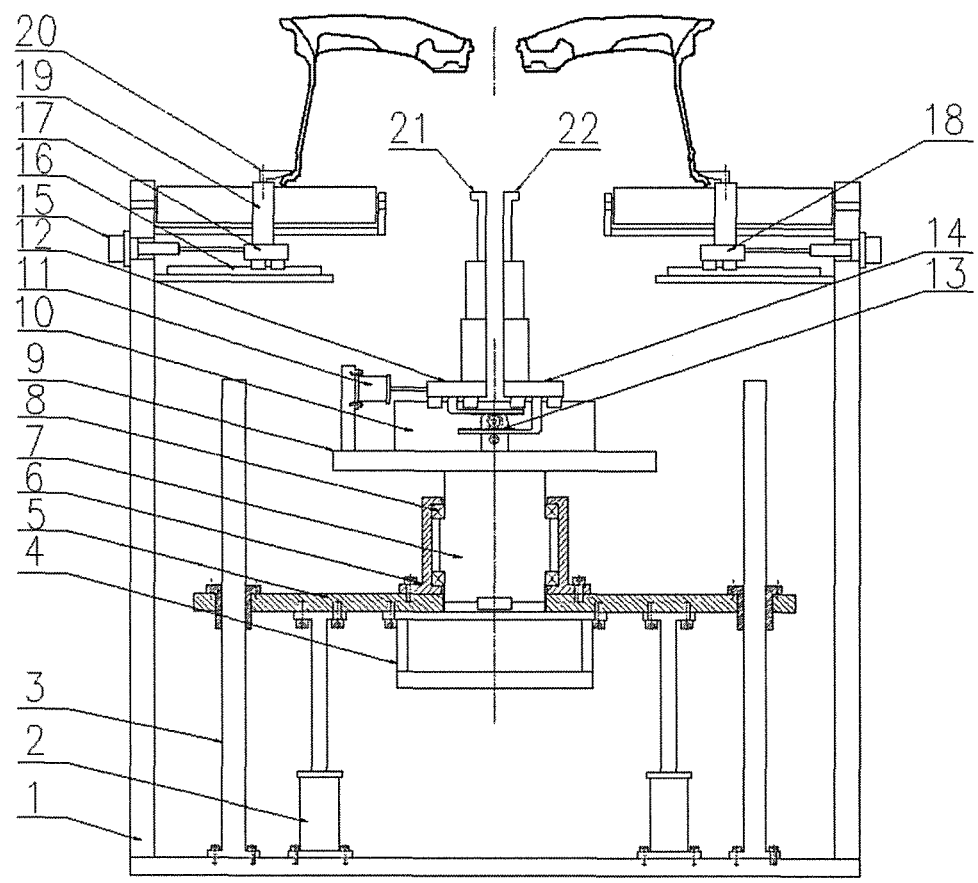
FIG. 1 is a front view of a high-precision wheel cap section burr removing device of the present application.
Figure 2:
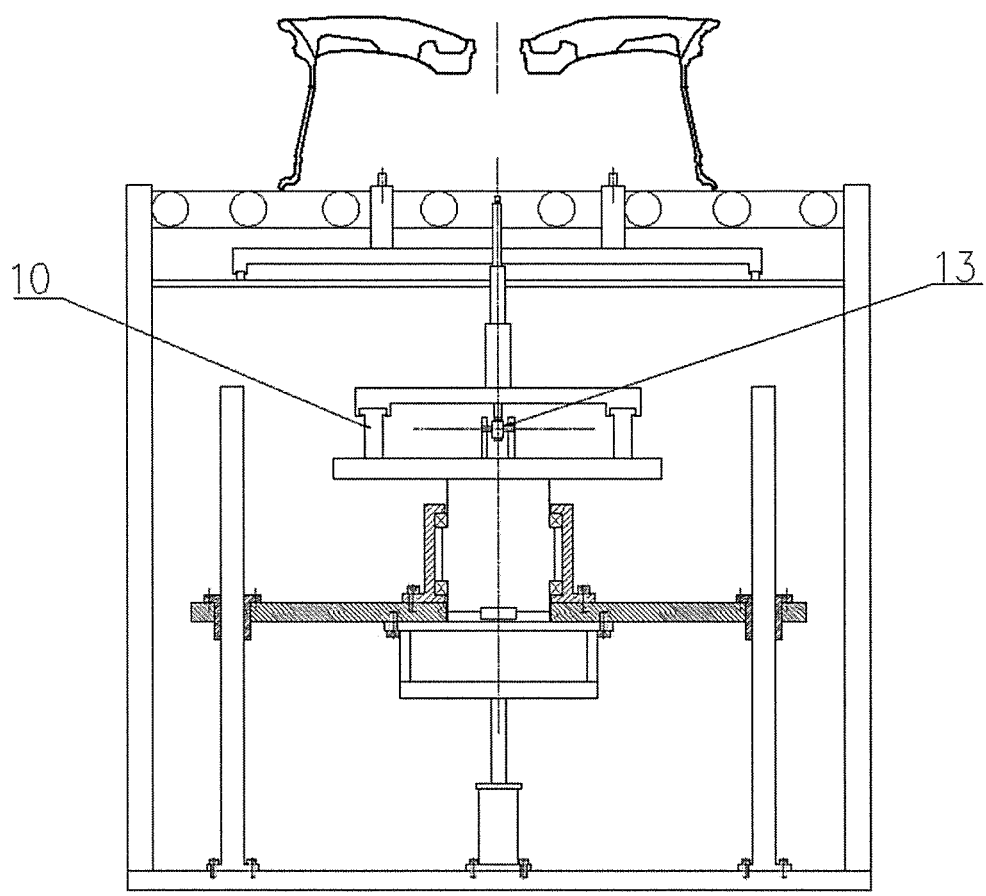
FIG. 2 is a left view of the high-precision wheel cap section burr removing device of the present application.
Figure 3:
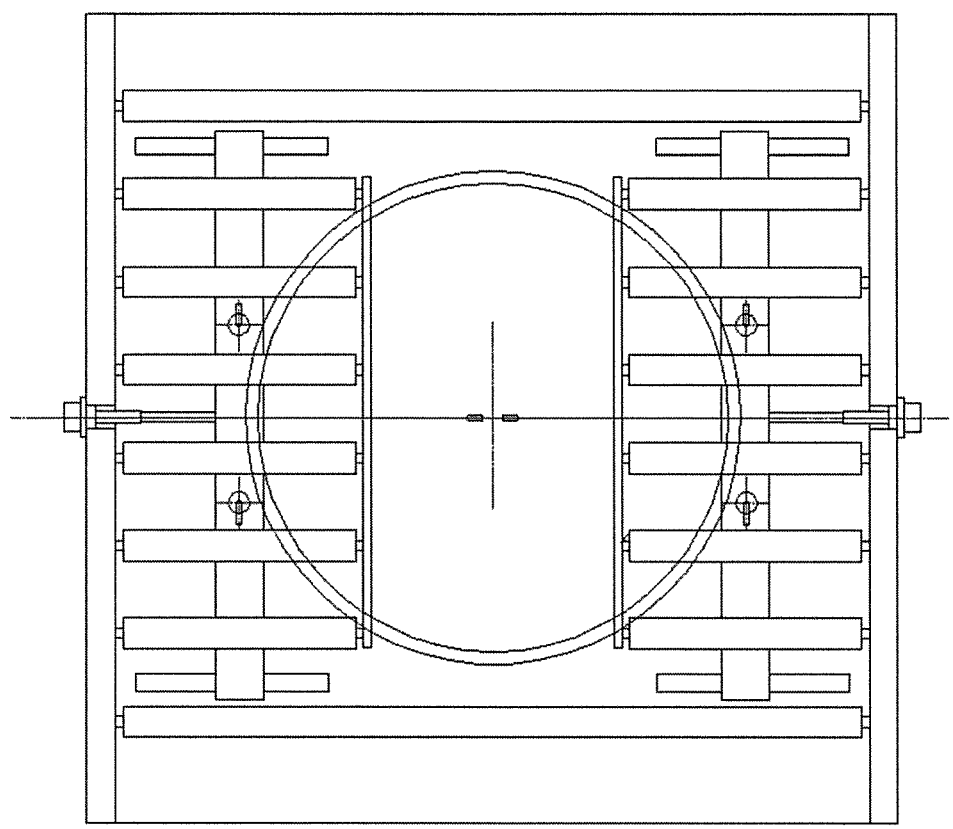
FIG. 3 is a top view of the high-precision wheel cap section burr removing device of the present application.
Figure 4:
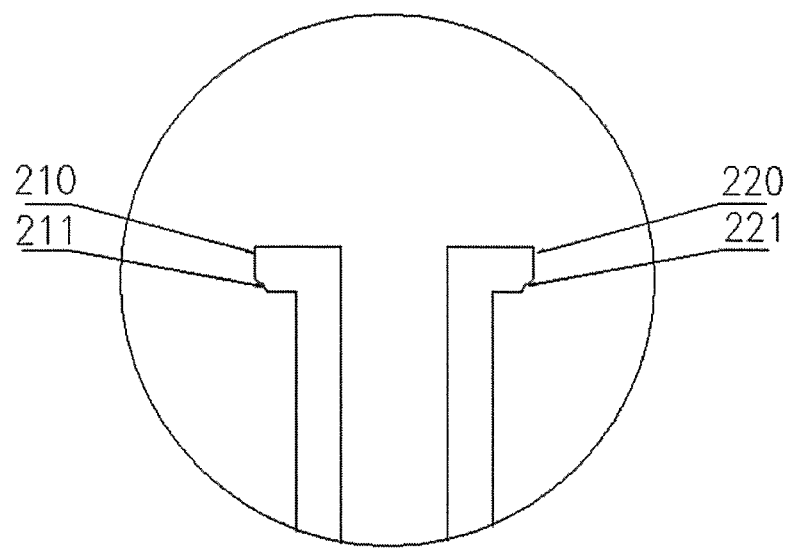
FIG. 4 is a partial view of a burr cutter of the high-precision wheel cap section burr removing device of the present application.
Figure 5:
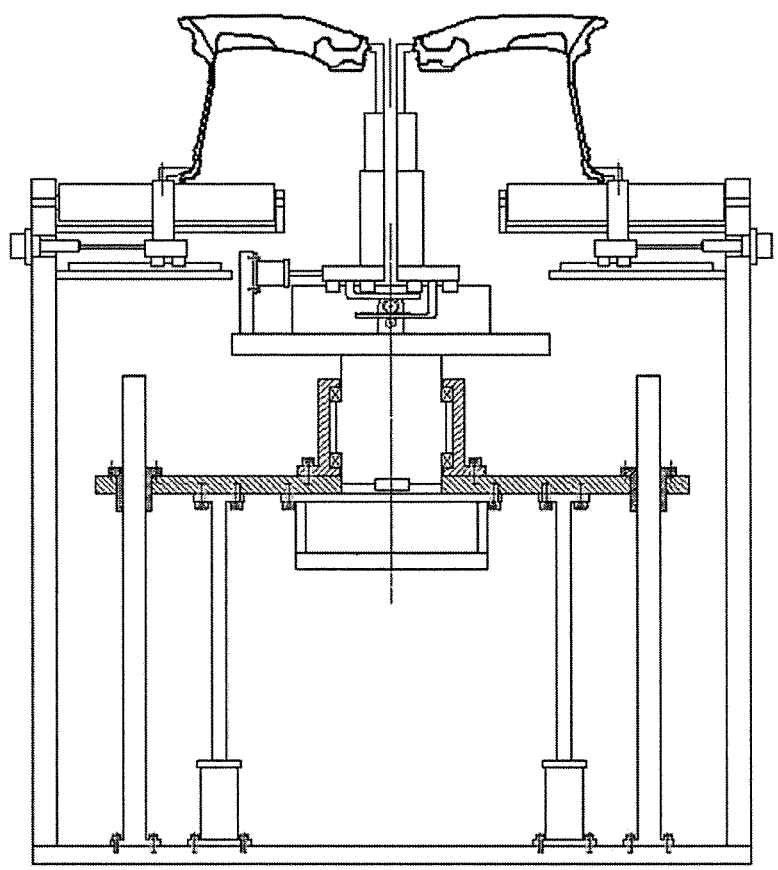
FIG. 5 is a schematic diagram of the high-precision wheel cap section burr removing device of the present application during high-precision positioning.
Figure 6:
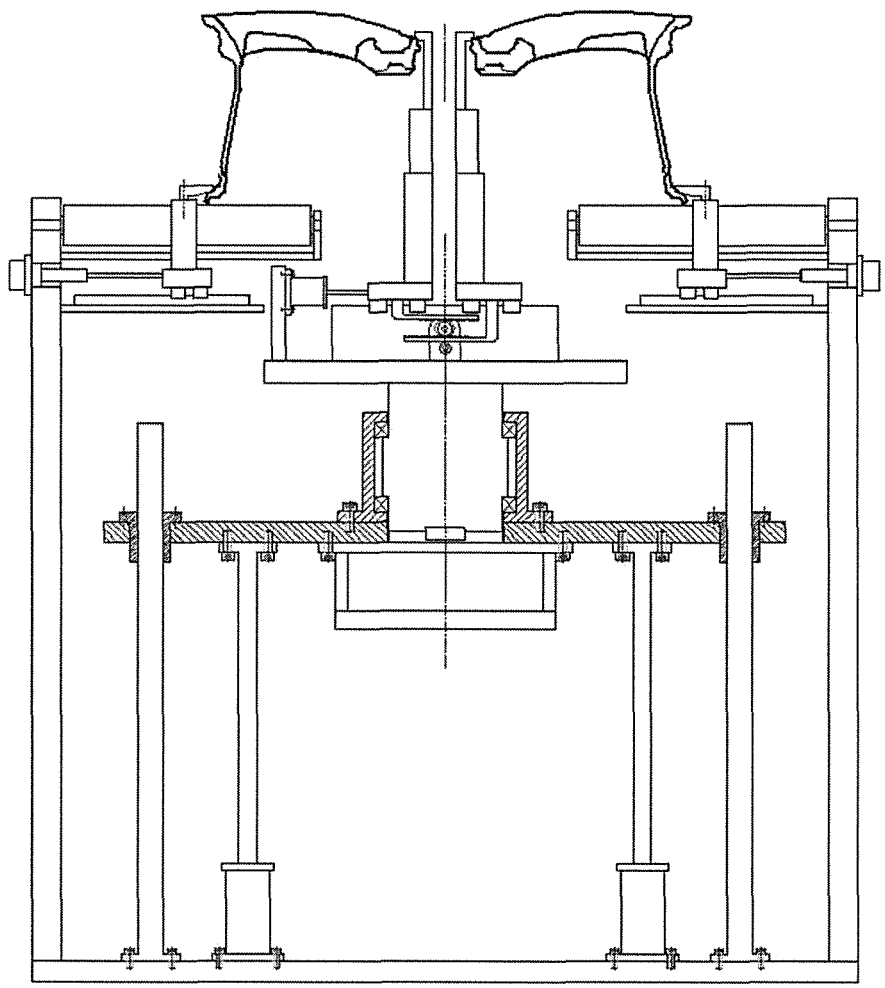
FIG. 6 is a schematic diagram when the high-precision wheel cap section burr removing device of the present application removes cap section burrs.

In figures: 1—frame, 2—jacking cylinder, 3—guide post, 4—servo motor, 5—lifting table, 6—bearing seat, 7—shaft, 8—bearing, 9—rotating table, 10—adjusting guide rail, 11—adjusting cylinder, 12—left sliding table, 13—gear rack, 14—right sliding table, 15—pre-positioning cylinder, 16—pre-positioning guide rail, 17—sliding plate I, 18—sliding plate II, 19—pre-positioning post, 20—corner cylinder pressure claw, 21—left burr cutter, 22—right burr cutter, 210—left precision positioning surface, 211—left cutting edge, 220—right precision positioning surface, 221—right cutting edge.

DETAILED DESCRIPTION OF THE INVENTION

Details and working conditions of a specific device provided by the present application will be given below in combination with the accompanying drawings.

A high-precision wheel cap section burr removing device includes a frame 1, jacking cylinders 2, guide posts 3, a servo motor 4, a lifting table 5, a bearing seat 6, a shaft 7, a bearing 8, a rotating table 9, adjusting guide rails 10, an adjusting cylinder 11, a left sliding table 12, a gear rack 13, a right sliding table 14, pre-positioning cylinders 15, pre-positioning guide rails 16, a sliding plate I 17, a sliding plate II 18, pre-positioning posts 19, corner cylinder pressure claws 20, a left burr cutter 21 and a right burr cutter 22.

The four pre-positioning guide rails 16 are symmetrically mounted on the frame 1, and the sliding plate I 17 and the sliding plate II 18 are respectively mounted on the pre-positioning guide rails 16 and driven by the pre-positioning cylinders 15. Two pre-positioning posts 19 are mounted on the sliding plate I 17, another two pre-positioning posts 19 are also symmetrically mounted on the sliding plate II 18, and the corner cylinder pressure claws 20 are mounted on the pre-positioning posts 19. When the left and right pre-positioning cylinders 15 drive the sliding plate 117 and the sliding plate II 18 to move synchronously, the four pre-positioning posts 19 can pre-position a wheel; and after pre-positioning of the wheel is completed, the pre-positioning cylinders 15 drive the sliding plate I 17 and the sliding plate II 18 to synchronously retract a distance, the four pre-positioning posts 19 do not contact the wheel any more, the clearance is preferably 2-3 mm, and the clearance is reserved for precision positioning.

The two jacking cylinders 2 and the four guide posts 3 are mounted at the bottom of the frame 1, the output ends of the jacking cylinders 2 are connected with the lifting table 5, the servo motor 4 is mounted on the lifting table 5, the output end of the servo motor 4 is connected with the rotating table 9 via the shaft 7, the bearing 8 and the bearing seat 6, the rotating table 9 can be driven to move up and down by extension and retraction of the jacking cylinders 2, and the servo motor 4 can drive the rotating table 9 to rotate.

The two adjusting guide rails 10 are mounted on the rotating table 9, the left sliding table 12 and the right sliding table 14 are symmetrically mounted on the adjusting guide rails 10 and connected by the gear rack 13, the adjusting cylinder 11 is fixed on the side of the rotating table 9, and the output end of the adjusting cylinder 11 is connected with the left sliding table 12. The left burr cutter 21 and the right burr cutter 22 are symmetrically mounted on the left sliding table 12 and the right sliding table 14, the top of the left burr cutter 21 is composed of a left precision positioning surface 210 and a left cutting edge 211, and the top of the right burr cutter 22 is composed of a right precision positioning surface 220 and a right cutting edge 221. The left precision positioning surface 210 and the right precision positioning surface 220 constitute a precision positioning system, and the left cutting edge 211 and the right cutting edge 221 constitute a cutter system. When the adjusting cylinder 11 drives the left sliding table 12 and the right sliding table 14 to move synchronously, the distance between the left precision positioning surface 210 and the right precision positioning surface 220 can be adjusted to match the diameter side of a cap seam allowance, thereby realizing precision positioning; and the distance between the left cutting edge 211 and the right cutting edge 221 can also be adjusted to contact cap section burrs. The precision positioning system and the burr removing cutter system are integrated to reduce the combined error, and the rotating centers of the burr cutters are superposed with the central axes of the cap section burrs to realize high-precision burr removal, thereby effectively solving the problems of deviation and non-uniformity of burr removal at the cap section.

The working process of the device is as follows: firstly, the left and right pre-positioning cylinders 15 are synchronously started to drive the sliding plate I 17 and the sliding plate II 18 to move synchronously, the four pre-positioning posts 19 can pre-position a wheel; and after pre-positioning of the wheel is completed, the pre-positioning cylinders 15 drive the sliding plate I 17 and the sliding plate II 18 to synchronously retract a distance, the four pre-positioning posts 19 do not contact the wheel any more, the clearance is preferably 2-3 mm, and the clearance is reserved for precision positioning. Then, the jacking cylinders 2 are started to drive the rotating table 9 to ascend; when the positioning surfaces of the left burr cutter 21 and the right burr cutter 22 reach the cap seam allowance of the wheel, the rotating table 9 stops ascending, at the moment, the adjusting cylinder 11 is started to adjust the distance between the left burr cutter 21 and the right burr cutter 22, the left precision positioning surface 210 and the right precision positioning surface 220 contact the diameter side of the cap seam allowance to hold the cap seam allowance of the wheel tightly, and precision positioning of the wheel is thus completed; and after precision positioning of the wheel, the corner cylinder pressure claws 20 are started to press the wheel. Next, the adjusting cylinder 11 is continuously started to shorten the distance between the left burr cutter 21 and the right burr cutter 22, the positioning surfaces leave the sides of the cap seam allowance, and then the jacking cylinders 2 are started to drive the burr cutters to ascend; when the cutting edges of the burr cutters reach the height of the cap section burrs, the burr cutters stop ascending, at the moment, the adjusting cylinder 11 is restarted to adjust the distance between the left cutting edge 211 and the right cutting edge 221, and the cutting edges contact the cap section burrs; and finally, the servo motor 4 drives the rotating table 9 to rotate one circle, and the cutting edges of the burr cutters remove the ring of burrs. After the burrs are removed, the positioning system and the cutter system are reset, this is a cyclic working process of the device, and so on.

The precision positioning system and the burr removing cutter system are integrated to reduce the combined error, and the rotating centers of the burr cutters are superposed with the central axes of the cap section burrs to realize high-precision burr removal, thereby effectively solving the problems of deviation and non-uniformity of burr removal at the cap section. The device has the characteristics of novel structure, skilful design, accuracy, high efficiency, simple operation and the like.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A high-precision wheel cap section burr removing device, comprising a frame, jacking cylinders, guide posts, a servo motor, a lifting table, a bearing seat, a shaft, a bearing, a rotating table, adjusting guide rails, an adjusting cylinder, a left sliding table, a gear rack, a right sliding table, pre-positioning cylinders, pre-positioning guide rails, a sliding plate I, a sliding plate II, pre-positioning posts, corner cylinder pressure claws, a left burr cutter and a right burr cutter, wherein the left burr cutter and the right burr cutter are symmetrically mounted on the left sliding table and the right sliding table, the top of the left burr cutter comprises a left precision positioning surface and a left cutting edge, the top of the right burr cutter comprises a right precision positioning surface and a right cutting edge, the left precision positioning surface and the right precision positioning surface constitute a precision positioning system, and the left cutting edge and the right cutting edge constitute a cutter system;

the left sliding table and the right sliding table are connected by the gear rack, the adjusting cylinder is fixed on the side of the rotating table, and the output end of the adjusting cylinder is connected with the left sliding table;

the working process of the device is as follows: firstly, the left and right pre-positioning cylinders are synchronously started to drive the sliding plate I and the sliding plate II to move synchronously, the four pre-positioning posts can pre-position a wheel; and after pre-positioning of the wheel is completed, the pre-positioning cylinders drive the sliding plate I and the sliding plate II to synchronously retract a distance, the four pre-positioning posts do not contact the wheel any more, the clearance is preferably 2-3 mm, and the clearance is reserved for precision positioning; then, the jacking cylinders are started to drive the rotating table to ascend; when the positioning surfaces of the left burr cutter and the right burr cutter reach the cap seam allowance of the wheel, the rotating table stops ascending, at the moment, the adjusting cylinder is started to adjust the distance between the left burr cutter and the right burr cutter, the left precision positioning surface and the right precision positioning surface contact the diameter side of the cap seam allowance to hold the cap seam allowance of the wheel tightly, and precision positioning of the wheel is thus completed; and after precision positioning of the wheel, the corner cylinder pressure claws are started to press the wheel; next, the adjusting cylinder is continuously started to shorten the distance between the left burr cutter and the right burr cutter, the positioning surfaces leave the sides of the cap seam allowance, and then the jacking cylinders are started to drive the burr cutters to ascend; when the cutting edges of the burr cutters reach the height of the cap section burrs, the burr cutters stop ascending, at the moment, the adjusting cylinder is restarted to adjust the distance between the left cutting edge and the right cutting edge, and the cutting edges contact the cap section burrs; and finally, the servo motor drives the rotating table to rotate one circle, and the cutting edges of the burr cutters remove the ring of burrs.

* * * * *